United States Patent [19]
Araki et al.

[11] 4,437,800
[45] Mar. 20, 1984

[54] CUTTING TOOL

[75] Inventors: Masatada Araki, Handa; Yukio Tanaka, Aichi, both of Japan

[73] Assignee: Nippon Oil and Fats, Co., Ltd., Tokyo, Japan

[21] Appl. No.: 298,108

[22] Filed: Aug. 31, 1981

[30] Foreign Application Priority Data

Sep. 3, 1980 [JP] Japan ................. 55-121200

[51] Int. Cl.³ .............................. B23G 1/20
[52] U.S. Cl. .................... 407/119; 407/118; 144/241
[58] Field of Search ............... 407/118, 119; 144/241

[56] References Cited

U.S. PATENT DOCUMENTS

| | | | |
|---|---|---|---|
| 3,455,000 | 7/1969 | Flaherty | 407/119 X |
| 3,482,295 | 12/1969 | Trent | 407/119 X |
| 3,643,309 | 2/1972 | Anschutz | 407/119 X |
| 3,755,866 | 9/1973 | Ohlsson | 407/119 |

FOREIGN PATENT DOCUMENTS

| | | | |
|---|---|---|---|
| 19461 | 11/1980 | European Pat. Off. | 407/119 |
| 6152541 | 4/1980 | Japan | 407/119 |
| 6069282 | 6/1981 | Japan | 407/119 |

OTHER PUBLICATIONS

*New Diamonite Superigid Tool Holder*, Diamonite Products Manufacturing Company.

*Primary Examiner*—W. D. Bray
*Attorney, Agent, or Firm*—Parkhurst & Oliff

[57] ABSTRACT

A cutting tool having a high wear resistance is disclosed. The cutting tool consists of a plate-shaped body comprising a sintered cermet layer and a sintered body layer containing high density boron nitride or diamond, said sintered cermet layer constituting the center portion of the plate-shaped body and being surrounded and adhered at the side surface or at the side surface and upper and lower surfaces with the sintered body layer.

2 Claims, 18 Drawing Figures

FIG_7a
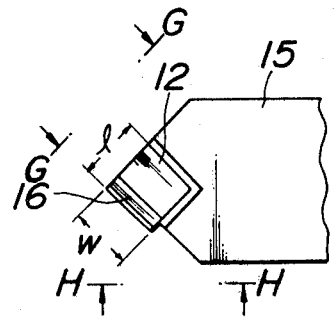
FIG_7b  FIG_7c
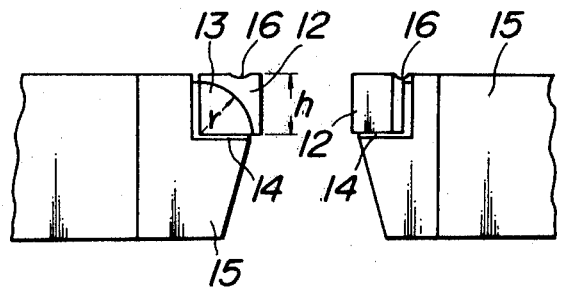
FIG_8a  FIG_8b
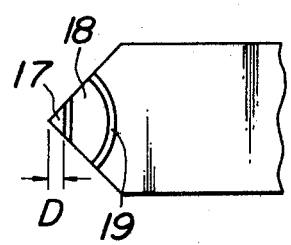
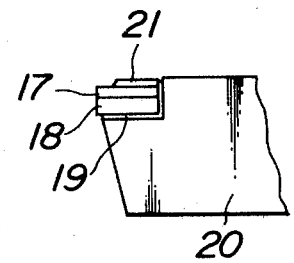

CUTTING TOOL

BACKGROUND OF THE INVENTION (1) Field of the Invention

The present invention relates to a cutting tool comprising a sintered body layer containing high density boron nitride or diamond and a sintered cermet layer.

(2) Description of the Prior Art

There are two kinds in the high density boron nitride, the one is cubic system boron nitride and the other is wurtzite-structured boron nitride. While, there are two kinds of the diamond, the one is cubic system diamond and the other is hexagonal system diamond. All of these high density boron nitrides and diamonds must be treated under high pressure and high temperature in order to sinter them. Further, high density boron nitride and diamond are expensive as a raw material, and therefore when they are formed into a sintered body and used as a cutting tool, the resulting cutting tool is very expensive as compared with conventional cutting tools. Accordingly, in order to lower the raw material cost occupied in the production cost of cutting tool, a thin layer having a thickness of 0.5–2 mm of sintered body containing high density boron nitride or diamond has been generally laminated on a cemented carbide layer. Substantially all of the cutting tools sold in the market use a sintered body layer laminated on a cemented carbide layer. The use of the sintered body (hereinafter, referred to as laminated sintered body), which is formed by laminating a sintered body layer containing high density boron nitride or diamond on a cemented carbide layer, has the following merits that the use amount of the expensive raw materials can be saved, that the hard but brittle sintered body layer containing high density boron nitride or diamond can be reinforced by the lining of the cemented carbide layer, and that, although the sintered body layer containing high density boron nitride or diamond, can not be directly brazed to a shank of tool, the surface of the cemented carbide layer lined to the sintered body layer can be brazed to a shank of tool or to a base having a shape of throwaway tip.

However, the laminated sintered body having the above described merits has the following drawbacks at the same time. That is, the sintered body layer portion containing high density boron nitride or diamond in the laminated sintered body is thin, and therefore it is very difficult or substantially impossible to engrave the surface of the sintered body layer so as to form a chip breaker or to work so as to form a projected chip breaker. As a means for obviating the drawbacks, Japanese Patent Laid Open Application No. 140,284/79 discloses a method, wherein a plate-shaped element is bonded to the rake face of a sintered body layer containing high density boron nitride or diamond or a mixture thereof, and the plate-shaped element is left on the rake face and used as a chip breaker. However, the plate-shaped element bonded to the rake face in this method is made of cemented carbide, molybdenum, steel or the like having a toughness higher than that of the sintered body layer, and therefore the plate-shaped element is lower in the hardness than the sintered body layer containing high density boron nitride or diamond, and is easily worn under a severe cutting condition. Furthermore, conventional laminated sintered body can not be used in a cutting tool, which uses the side surface of throwaway tip as a rake face, in so far as the laminated sintered body has the conventional shape.

The inventors have taken the above described problems into consideration, and made various investigations in order to save the use amount of expensive raw material and concurrently to solve the above described drawbacks, and accomplished the present invention.

SUMMARY OF THE INVENTION

The feature of the present invention is the provision of a cutting tool consisting of a plate-shaped sintered body comprising a sintered cermet layer formed of, for example, tungsten carbide-cobalt alloy, and a sintered body layer containing high density boron nitride or diamond, said sintered cermet layer constituting the center portion of the plate-shaped sintered body and being surrounded and adhered at the side surface or at the side surface and upper and lower surfaces with the sintered body layer.

BRIEF DESCRIPTION OF THE DRAWINGS

FIG. 1b is a diagrammatic sectional view of the cutting tool illustrated in FIG. 1a along line A—A in the arrow direction in FIG. 1a;

FIG. 2b is a diagrammatic sectional view of the throwaway type tip illustrated in FIG. 2a along line B—B in the arrow direction in FIG. 2a;

FIG. 3b is a diagrammatic sectional view of the cutting tool illustrated in FIG. 3a along line C—C in the arrow direction in FIG. 3a;

FIG. 4b is a diagrammatic sectional view of the chip illustrated in FIG. 4a along line D—D in the arrow direction in FIG. 4a;

FIG. 5b is a diagrammatic sectional view of the cutting tool illustrated in FIG. 5a along line E—E in the arrow direction in FIG. 5a;

FIG. 6b is a diagrammatic side view of the cutting tool illustrated in FIG. 6a;

FIG. 6c is a diagrammatic sectional view of the cutting tool illustrated in FIG. 6a along line F—F in the arrow direction in FIG. 6a;

FIG. 7a is a diagrammatic plan view of a cutting tool produced by dividing the cutting tool illustrated in FIGS. 2a and 2b into four equal pieces, in a brazed state to a steel shank;

FIG. 7b is a diagrammatic side view of the cutting tool illustrated in FIG. 7a along line G—G in the arrow direction in FIG. 7a;

FIG. 7c is a diagrammatic side view of the cutting tool illustrated in FIG. 7a along line H—H in the arrow direction in FIG. 7a;

FIG. 8a is a diagrammatic plan view of a cutting tool produced from a conventional laminated sintered body in a brazed state to a steel shank; and FIG. 8b is a diagrammatic side view of the cutting tool illustrated in FIG. 8a.

DESCRIPTION OF THE PREFERRED EMBODIMENT

Figure 1A:
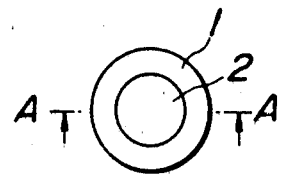
FIG. 1a is a diagrammatic plan view of one embodiment of the cutting tool of the present invention.

The present invention will be explained referring to the drawings.

Figure 1B:

FIG. 1a is a diagrammatic plan view of a cutting tool of the present invention, and FIG. 1b is a diagrammatic sectional view of the cutting tool illustrated in FIG. 1a along line A—A in the arrow direction in FIG. 1a. The numeral 1 represents a sintered body layer containing high density boron nitride or diamond, and the numeral 2 represents a sintered cermet layer. The sintered body layer having the shape illustrated in FIGS. 1a and 1b can be produced by a commonly used high-pressure and high-temperature sintering method. For example, in a method for producing conventional laminated sintered body, a raw material containing high density boron nitride or diamond is placed on a powdery, semi-sintered or sintered cemented carbide layer, if necessary, through an adhesive layer; and the resulting mass is placed in a capsule (not shown), and the capsule is arranged in a belt type, girdle type or other type high-pressure and high-temperature apparatus (not shown) and heated under pressure in the apparatus to sinter the mass. The sintered body layer of the present invention can be produced according to the above described method by arranging the raw material layers in the capsule such that the raw material layers correspond to the shape of the aimed cutting tool illustrated in FIGS. 1a and 1b. In this case, the raw materials are deformed when the raw materials are pressed in a hig-pressure and high-temperature apparatus, and therefore semi-sintered or powdery cemented carbide is used more preferably in the sintered cermet layer portion corresponding to the core portion than sintered cemented carbide. However, even the sintered cemented carbide can be used without particular troubles except that the sintered cemented carbide is somewhat troublesome in the cutting after sintering. An adhesive metal layer may be arranged at the interface between the sintered body layer 1 containing high density boron nitride or diamond and the sintered cerment layer 2 depending upon the composition of the sintered body layer 1 and that of the sintered cermet layer 2.

Figure 2A:
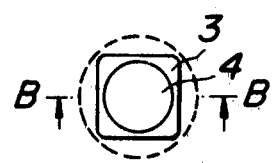
FIG. 2a is a diagrammatic plan view of a throwaway type tip produced by working the cutting tool illustrated in FIGS. 1a and 1b.
Figure 2B:

FIG. 2a is a diagrammatic plan view of a throwaway type tip obtained by grinding the cutting tool illustrated in FIGS. 1a and 1b. The area shown by a dotted line represents a profile of the area removed by the grinding. FIG. 2b is a diagrammatic sectional view of the throwaway type tip illustrated in FIG. 2a along line B—B in the arrow direction in FIG. 2a. In FIGS. 2a and 2b, the numeral 3 represents a sintered body layer containing high density boron nitride or diamond, and the numeral 4 represents a sintered cermet layer. The cutting tool illustrated in FIGS. 1a and 1b has a circular plan view in both the core portion and the outer peripheral portion. However, one or both of the core portion and outer peripheral portion may be polygons, such as square, triangle and the like. Particularly, the boundary portion between the core portion and the outer peripheral portion may be formed into complicated shapes, such as petal shape, star shape and the like, in order to increase the contact area of the core portion with the outer peripheral portion and to increase the adhesion strength.

Figure 3A:
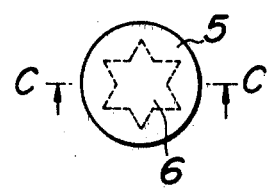
FIG. 3a is a diagrammatic view of a further embodiment of the cutting tool of the present invention.
Figure 3B:
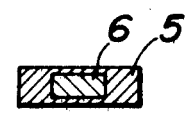

FIG. 3a is a diagrammatic plan view of a further embodiment of a cutting tool of the present invention, comprising a sintered body layer 5 containing high density boron nitride or diamond, and a star-shaped sintered cermet layer 6 as viewed in a plan view, which is embedded in the sintered body layer 5. FIG. 3b is a diagrammatic sectional view of the cutting tool illustrated in FIG. 3a along line C—C in the arrow direction in FIG. 3a. This cutting tool can not be brazed, but has merits that expensive raw material can be saved; the toughness of the sintered body layer 5 can be increased by sintering concurrently the sintered body layer 5 and the sintered cermet layer 6, and the sintered body layer 5 containing high density boron nitride or diamond can be engraved to form a chip breaker or can be worked to form a projected chip breaker.

Figure 4A:
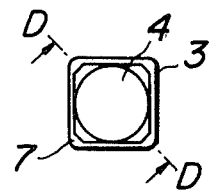
FIG. 4a is a diagrammatic plan view of one embodiment of a throwaway type tip similar to that illustrated in FIGS. 2a and 2b, but having a chip breaker.
Figure 4B:
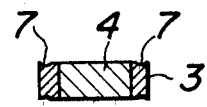

FIG. 4a is a diagrammatic plan view of a throwaway type tip similar to that illustrated in FIGS. 2a and 2b, but having a chip breaker formed by engraving the sintered body layer 5. FIG. 4b is a diagrammatic sectional view of the tip illustrated in FIG. 4a along line D—D in the arrow direction in FIG. 4a.

Figure 5A:
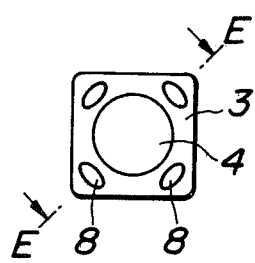
FIG. 5a is a diagrammatic plan view of another embodiment of a throwaway type tip similar to that illustrated in FIGS. 2a and 2b, but having a projected chip breaker.
Figure 5B:
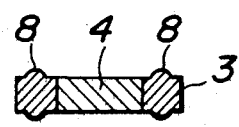

FIG. 5a is a diagrammatic plan view of a throwaway type tip having a projected chip breaker 8 contrary to the tip illustrated in FIGS. 4a and 4b. FIG. 5b is a diagrammatic sectional view of the tip illustrated in FIG. 5a along line E—E in the arrow direction in FIG. 5a.

Figure 6A:
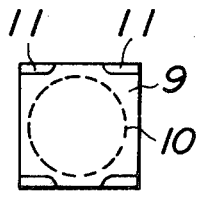
FIG. 6a is a diagrammatic plan view of a cutting tool, which is produced by embedding a sintered cermet layer in a sintered body layer containing high density boron nitride or diamond, and working the mass into a throwaway type tip such that the side surface having a chip breaker is used as a rake face.
Figure 6B:
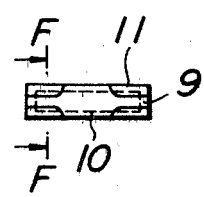
Figure 6C:
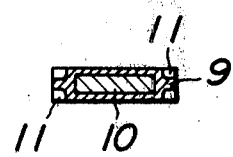

FIG. 6a is a diagrammatic plan view of a cutting tool, which is formed by sintering raw materials such that the side surface and upper and bottom surfaces of a sintered cermet layer 10 would be surrounded with a sintered body layer 9 containing high density boron nitride or diamond, working the sintered article into a throwaway type tip, and engraving the tip at the four corners on its upper and bottom surfaces so as to form chip breakers 11 extending from the side surface towards the upper surface and from the side surface towards the bottom surface. FIG. 6b is a diagrammatic side view of the cutting tool illustrated in FIG. 6a, and FIG. 6c is a diagrammatic sectional view of the cutting tool illustrated in FIGS. 6a and 6b along line F—F in the arrow direction in FIG. 6b. In the plate-shaped throwaway type tip of this kind, its side surface is adapted to be used as a rake face.

FIG. 7a is a diagrammatic plan view of a cutting tool produced by dividing the cutting tool illustrated in FIGS. 2a and 2b into four pieces, in a brazed state to a steel shank. FIG. 7b is a diagrammatic side view of the cutting tool illustrated in FIG. 7a along line G—G in the arrow direction in FIG. 7a. The numeral 12 represents a sintered body layer containing high density boron nitride or diamond, the numeral 13 represents a sintered cermet layer, the numeral 14 represents a braze layer, and the numeral 15 represents a steel shank. FIG. 7c is a diagrammatic side view of the cutting tool illustrated in FIG. 7a along line H—H in the arrow direction in FIG. 7a, which side view is opposite to that of FIG. 7b. The numeral 16 in FIG. 7a represents a chip breaker and it can be easily understood that a chip breaker can be easily formed in the cutting tool of the present invention. Particularly, in the cutting tool illustrated in FIGS. 7a, 7b and 7c, stress is dispersed and transmitted from sintered body layer 12 containing high density boron nitride or diamond to sintered cermet layer 13, and therefore the cutting tool can be used more advantageously in the cutting under high load than conventional laminated sintered body.

FIG. 8a is a diagrammatic plan view of a cutting tool produced from a conventional sintered body in a brazed state to a steel shank. FIG. 8b is a diagrammatic side view of the cutting tool illustrated in FIG. 8a. The numeral 17 represents a sintered body layer containing high density boron nitride, the numeral 18 represents a cemented carbide layer, the numeral 19 represents a silver solder, the numeral 20 is a steel shank, and the numeral 21 represents a chip breaker having a molybdenum capsule formed thereon.

The following examples are given for the purpose of illustration of this invention and are not intended as limitations thereof.

EXAMPLE 1

A powdery mixture consisting of 92% by weight of tungsten carbide and 8% by weight of cobalt was used as a raw material for obtaining a sintered cermet layer, and preliminarily molded into a column-like shaped article. A powdery mixture consisting of 55% by volume of wurtzite-structured boron nitride, 25% by volume of titanium carbide, 4% by volume of nickel, 6% by volume of aluminum and 10% by volume of boron was used as a raw material for obtaining a sintered body layer containing high density boron nitride, and preliminarily molded into a hollow cylindrical shaped article. The column-like preliminarily shaped article for obtaining the sintered cermet layer was arranged in a core portion, and the hollow cylindrical preliminary shaped article for obtaining the sintered body layer was arranged so as to surround the side peripheral surface of the column-like preliminarily shaped article, and the resulting assembly was placed in a molybdenum capsule, and sintered under a condition of a pressure of 6.2 GPa and a temperature of 1,550° C. in a belt-type high-pressure and high-temperature appratus. After the sintering, the molybdenum capsule arranged at the outer surface of the sintered article was cut and removed to obtain a cutting tool having a diameter of 14 mm, a diameter in the sintered cermet layer of 9 mm and a height of 4.5 mm. Further, the resulting cutting tool was ground into a square shape as illustrated in FIG. 2, and the square shaped article was cut into quadrants to obtain a tip, which was 4 mm in the radius r of the sintered cermet layer 12 and 4.6 mm in the height h of the sintered body layer 12 containing high density boron nitride illustrated in FIG. 7b, and was 4 mm in the width w and 4.7 mm in the length l of the sintered body layer 12 containing high density boron nitride illustrated in FIG. 7a. The rake face of the sintered body layer 12, which contained high density boron nitride of the tip was ground by means of a diamond grinding wheel to form a chip breaker 16, and the tip having the chip breaker 16 was fixed to a shank 15 made of S 45C steel through silver solder 14 as illustrated in FIGS. 7a, 7b and 7c to obtain a cutting tool of the present invention. SUJ-2 steel previously heat treated into a hardness of 60 in the Rockwell Hardness C Scale was cut by the above obtained cutting tool of the present invention for 40 minutes under a condition of a peripheral velocity of 106 m/min, a depth of cut of 0.5 mm and a feed of 0.1 mm/rev. As the results, chips were broken throughout the total cutting time by the chip breaker 16 and there was no problem in the treatment of the chips.

COMPARATIVE EXAMPLE 1

A conventional laminated sintered body comprising a sintered body layer which contained high density boron nitride, and a cemented carbide layer was produced from raw material mixtures having the same composition as described in Example 1 under the same sintering condition as described in Example 1, and the resulting laminated sintered body was worked into a cutting tool illustrated in FIGS. 8a and 8b. During the cutting working, major part of molybdenum capsule, which had been used at the sintering and had been still adhered to the laminated sintered body, was cut and removed, and a part of the molybdenum capsule portion remaining on the laminated sintered body was used as a chip breaker 21. In the resulting cutting tool, the cemented carbide layer 18 and a radius of 4.5 mm and a thickness of 2.1 mm, and the chip breaker 21 had a thickness of 0.8 mm and a length D of the exposed portion of the rake face of 1.5 mm.

A cutting test was carried out in the same manner is described in Example 1 by the use of the above obtained cutting tool comprising conventional laminated sintered body. As the results, broken chips were formed similarly to the case of Example 1 at the initial stage of the cutting, but after 100 seconds from the beginning of the cutting, the chip breaker 21, which had been formed by leaving a part of the molybdenum capsule, was worn by the flow of chips and did not act as a chip breaker. That is, continuous chips were flowed out, and a removing operation of the continuous chips by wire must be carried out, and cutting operation was disturbed.

EXAMPLE 2

A cutting tool was produced according to Example 1, except that a sintered body layer containing diamond was used as a sintered body layer in place of high density boron nitride. A cutting test was effected by using the cutting tool in the same manner as described in Example 1, except that brass was used in place of SUJ-2 steel used in Example 1. As the results, chips were broken by the chip breaker throughout the total cutting time, and there was no problem in the treatment of chips.

It is clear from the above described Examples and Comparative example that the cutting tool of the present invention can form a chip breaker by working the sintered body layer itself containing high density boron nitirde or diamond, and therefore the chip breaker has a high wear resistance and can exhibit satisfactory high cutting performance. Moreover, in the cutting tool of the present invention, stress can be dispersed and transmitted from the sintered body layer containing high density boron nitride or diamond to the sintered cermet layer, and further the cutting tool has a very high toughness in spite of the use of a small amount of expensive raw materials. Therefore, the cutting cool of the present invention has various excellent effects.

What is claimed is:

1. A cutting tool consisting of a plate-shaped body comprising a sintered cermet layer and a sintered body layer containing high density boron nitride or diamond, said sintered cermet layer constituting the center portion of the plate-shaped body and being surrounded and adhered at the side surface or at the side surface and upper and lower surfaces with the sintered body layer.

2. A cutting tool according to claim 1, wherein at least one surface of the side surface, upper surface and lower surface of the sintered body layer containing high density boron nitride or diamond is configured as a chip breaker.

* * * * *